United States Patent
Okada et al.

[11] Patent Number: 6,044,948
[45] Date of Patent: *Apr. 4, 2000

[54] STRUCTURE OF SPLINE-CONNECTION FOR POWER-TRANSMISSION DEVICE

[75] Inventors: Takashi Okada; Fumihito Konagaya, both of Shizuoka, Japan

[73] Assignee: Jatco Corporation, Fuji, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,028

[22] Filed: Jun. 30, 1997

[30] Foreign Application Priority Data

Jul. 5, 1996  [JP]  Japan ................................ 8-176192

[51] Int. Cl.$^7$ .................................................. F16D 13/52
[52] U.S. Cl. ................................... 192/70.2; 192/85 AA
[58] Field of Search ............................. 192/70.2, 85 AA; 475/275, 346

[56] References Cited

U.S. PATENT DOCUMENTS

| | | | |
|---|---|---|---|
| 4,566,571 | 1/1986 | Fujioka et al. | 192/70.2 |
| 4,714,146 | 12/1987 | Moroto et al. | 192/85 AA X |
| 4,836,052 | 6/1989 | Iwanaga et al. | 192/85 AA |
| 5,439,088 | 8/1995 | Michioka et al | 192/85 AA X |
| 5,483,850 | 1/1996 | Yamauchi | 192/85 AA |
| 5,642,958 | 7/1997 | Sugiyama | 192/70.2 X |
| 5,647,467 | 7/1997 | Yamauchi | 192/85 AA X |

FOREIGN PATENT DOCUMENTS 60-84444  5/1985  Japan .

OTHER PUBLICATIONS

Jatco Corporation, "Four–speed Full Range Electronically Controlled Automatic Transmision JF404E," Sep. 1995 (English language).
Jatco Corporation, "Four–speed Full Range Electronically Controlled Automatic Transmission JF404E," Sep. 1995 (Japanese language).
Jatco "JF404E Four–speed Full Range Electronically Controlled Automatic Transmission JF404E" (English language).

*Primary Examiner*—Charles A. Marmor
*Assistant Examiner*—Scott Lund
*Attorney, Agent, or Firm*—Foley & Lardner

[57] ABSTRACT

In a structure of spline-connection for a power-transmission device having a clutch drum integrally formed on its inner periphery with longitudinal internal splines, a clutch pack employing an alternating series of driven plates and driving discs, each of the driven plate being keyed on its outer edge so that the keyed section (the external splines) is fitted to the central spline-key section of said internal splines of the drum, and the other power-transmission member formed on its outer periphery with external teeth splined to the end spline-key section of said internal splines of the drum, a spline height of the end spline-key section is dimensioned to be greater than that of the central spline-key section.

4 Claims, 3 Drawing Sheets

STRUCTURE OF SPLINE-CONNECTION FOR POWER-TRANSMISSION DEVICE

BACKGROUND OF THE INVENTION

1. Field of the Invention

The present invention relates to a structure of spline-connection for use in a power-transmission device, and specifically to a structure of spline-connection which is suitably used for a power transmission device for example a multiple disc clutch, consisting of an alternating series of clutch plates and discs, in which one of the engaging pair and another rotational-force transmitting member are both splined to a clutch drum with a plurality of splines (longitudinal multiple keyways or spline grooves) machined on its inner periphery.

2. Description of the Prior Art

In recent years, on power-transmission devices, a plurality of power-transmitting elements are combined with each other by way of spline connection for fulfillment of more complicated power flow regardless of a simple structure of the power train. This type of power transmission device has been disclosed in Japanese Patent Provisional Publication No. 60-84444. FIG. 4 shows the same power-transmission device as indicated in the Japanese Patent Provisional Publication No. 60-84444. In the power-transmission device described in terms of an automatic speed change gear, as shown in FIG. 4, a certain rotating body (a rotary ring gear 6R), a rotary race 18, and a rotary clutch drum 16 are mechanically coupled with each other. The clutch drum 16 is integrally formed on its inner periphery with spline grooves into which mated disc-clutch plates are fitted. The ring gear 6R has several projections (external spline keys) cut on its outer periphery to axially slidably support thereon mating disc-clutch plates. Also, a planet pinion carrier 4C of a first planetary gears 4 is coupled through the rotary inner race 18 with the clutch drum 16. The inner race 18 has several external splines being mated with the spline grooves of the clutch drum 16. Hereinbelow described in more detail is the structure of the automatic speed change gear of the prior art, by reference to FIG. 4. As seen in FIG. 4, the first and second planetary gearsets 4 and 6 are arranged concentric to the input shaft 2. The first planetary gearset 4, is comprised of a central sun gear 4S, the planet pinion carrier 4C, a plurality of pinion gears (not numbered) and the ring gear 4R (the internal gear). A band brake (not shown) is usually provided to permit or stop rotation of the sun gear 4S. The planet pinion carrier 4C is properly engaged with the input shaft 2 by way of a clutch device (not shown) and is held stationary by engaging with the transmission case 10 by means of a one-way clutch 8. The ring gear 4R is fixedly connected to a planet pinion carrier 6C of the second planetary gearset 6. The sun gear 6S of the second planetary gearset 6 is splined to the transmission input shaft 2, while the planet pinion carrier 6C of the second planetary gearset 6 is splined to the transmission output shaft 12. The ring gear 6R is designed to be connectable to or disconnectable from the sun gear 4S of the first planetary gearset 4 through the multiple disc clutch pack 14 placed on the outer periphery of the ring gear 6R, the clutch drum 16 placed on the outer periphery of the disc clutch pack 14, and the rotary inner race 18 of the one-way clutch 8. As seen in FIG. 4, several internal splines are formed integral with the clutch drum 16 and usually consist of circumferentially equally-spaced keyways cut on the inner periphery of the drum 16. Similarly, several external splines are formed integral with the ring gear 6R and usually consist of circumferentially equally-spaced keys cut on the outer periphery of the ring gear 6R. The multiple disc clutch pack 14 is comprised of an alternating series of clutch plates (driven plates) and discs (driving discs), and a pressure plate. Each of the driven plates is keyed on its outer edge, whereas each of the driving discs is keyed on its inner edge. The keyed sections of the driven plates mounted on the inner periphery of the clutch drum are often called "external splines or spline keys". The keyed sections of the driving discs mounted on the outer periphery of the ring gear are often called "internal splines or spline keyways". The external splines of the driven plates of the clutch drum side are fitted into the internal splines of the clutch drum 16, while the internal splines of the driving discs of the ring gear side are fitted onto the external splines of the rotary ring gear 6R. Such spline connection permits axial sliding movement of each of the clutch plates and discs in the axial directions of the axis P of the transmission input or output shafts. On the other hand, the rotary inner race 18 is integrally formed with several radially outwardly projecting external splines 18a being splined to the internal splines of the clutch drum 16 to permit the axial sliding movement of the clutch drum 16 relative to the inner race 18. When working fluid (hydraulic oil) is supplied into a pressure chamber 20 defined in the clutch drum and thus a piston 22 with inner and outer piston seal rings moves rightwards (viewing FIG. 4) against the bias of a piston spring or springs 22a with oil pressure applied to the piston 22, the driven plates and driving discs are engaged with each other. This allows power or torque to flow from the transmission input shaft through the sun gear 4S of the first planetary gearset 4, the inner race 18, the clutch drum 16 and the multiple disc clutch 14 to the ring gear 6R of the second planetary gearset 6. Conversely, when the working fluid flows from the cylinder chamber 20 back to the return line and thus the pressure in the chamber 20 is reduced below a predetermined pressure level, the clutch is held by virtue of the bias of the piston spring 22a in its disengaged position in which the driving discs rotate freely between the driven plates.

In the prior art power-transmission device as discussed previously, the external splines 18a of the inner race 18 are additionally splined to the internal splines of the clutch drum 16. The axial length $T_1$ (the external spline width) of each of the splines of the inner race 18 is dimensioned to be a comparatively greater value in such a manner as to increase a spline contact area between the mating pair namely a certain external spline of the inner race 18 and the associated internal spline of the clutch drum 16. The increased axial length $T_1$ of the splines 18a causes the pressure between the surfaces in contact, that is, the side wall surface of the external spline 18a and the side wall surface of the internal spline of the clutch drum 16, during power-transmission operation, to be lowered effectively, thus increasing the life and mechanical strength of the splines 18a. However, the increased axial length $T_1$ of the splines 18a simultaneously results in the increase in the total thickness of the inner race itself. This prevents the entire size and dimensions of the power-transmission device from being small-sized or lightened. Additionally, in case of the prior art power-transmission device shown in FIG. 4, the clutch drum 16 is equipped at the right end with a snap ring 24 so that the left-hand side wall of the snap ring 24 faces to the right-hand face of each of the external splines 18a of the inner race. The snap ring 24 functions to restrict the maximum axial leftward movement of the drum 16 but not the rightward movement. Therefore, there is a possibility that the drum 16 repeatedly moves rapidly momentarily between an axially spaced position, in which the drum 16 is shifted axially rightwards and thus there is a clearance between the snap ring 24 and the right-hand side wall of the respective external spline 18a, to an abutment position, in which the drum 16 moves axially leftwards together with the piston 22 by way of the bias of the piston spring 22a and thus the snap ring 24 abuts the external splines 18a. This movement may causes undesired chattering noise, and thus the driver may feel uncomfortable.

SUMMARY OF THE INVENTION

Accordingly, it is an object of the invention to provide a structure of spline-connection for a power-transmission device which avoids the aforementioned disadvantages of the prior art.

It is another object of the invention to provide a spline-connection structure for a power-transmission device, which is capable of permitting another power-transmission member, being splined to a clutch drum associated with a ring gear (an internal gear) through a clutch pack, to be small-sized and lightened, and of ensuring the pressure between the surfaces of contact in the mating pair to be reduced.

It is a further object of the invention to provide a spline-connection structure for a power-transmission device which is capable of restricting the axial movement of the clutch drum in opposite axial directions.

In order to accomplish the aforementioned and other objects of the present invention, a structure of spline-connection for a power-transmission device comprises a longitudinal internal splined portion formed on an inner peripheral surface of a clutch drum of a friction element so that the longitudinal internal splined portion extends axially along the inner peripheral surface of the clutch drum, an external splined portion formed at another power-transmission member and splined to a first splined portion constructing an end of the longitudinal internal splined portion of the clutch drum, and an external splined portion formed on an outer edge of each clutch plate included in the friction element and splined to a second splined portion constructing a substantially central section of the longitudinal internal splined portion of the clutch drum, wherein a spline height ($T_2$) of the first splined portion is dimensioned to be greater than a spline height ($T_3$) of the second splined portion, and wherein a spline height of the external splined portion of the another power-transmission member is dimensioned to be equal to the spline height ($T_2$) of the first splined portion. It is preferable that the first splined portion of the clutch drum is formed with a cut-out portion machined by axially cutting at least one spline groove of the first splined portion from the end of the clutch drum, and the another power-transmission member is formed with an external toothed portion radially outwardly projecting through the cut-out portion so that the external toothed portion of the another power-transmission member fits to the cut-out portion. Preferably, the structure of spline-connection for a power-transmission device, may further comprise a snap ring being fitted onto the inner peripheral surface of the drum essentially at an outermost end of the first splined portion, and wherein the external toothed portion of the another power-transmission member is sandwiched between the snap ring and a radially-extending cut-out surface of the cut-out portion.

According to another aspect of the invention, a structure of spline-connection for a power-transmission device, comprises a two-stepped longitudinal splined portion consisting of an end splined portion constructing one end of an entire length thereof and a central splined portion constructing a central section of the entire length, a splined portion formed at a first power-transmission member and splined to the end splined portion, and a splined portion formed at a second power-transmission member and splined to the central splined portion, wherein a spline height ($T_2$) of the end splined portion is dimensioned to be greater than a spline height ($T_3$) of the central splined portion, and wherein a spline height of the splined portion of the first power-transmission member is dimensioned to be equal to the spline height ($T_2$) of the end splined portion.

DESCRIPTION OF THE PREFERRED EMBODIMENTS

Figure 1:
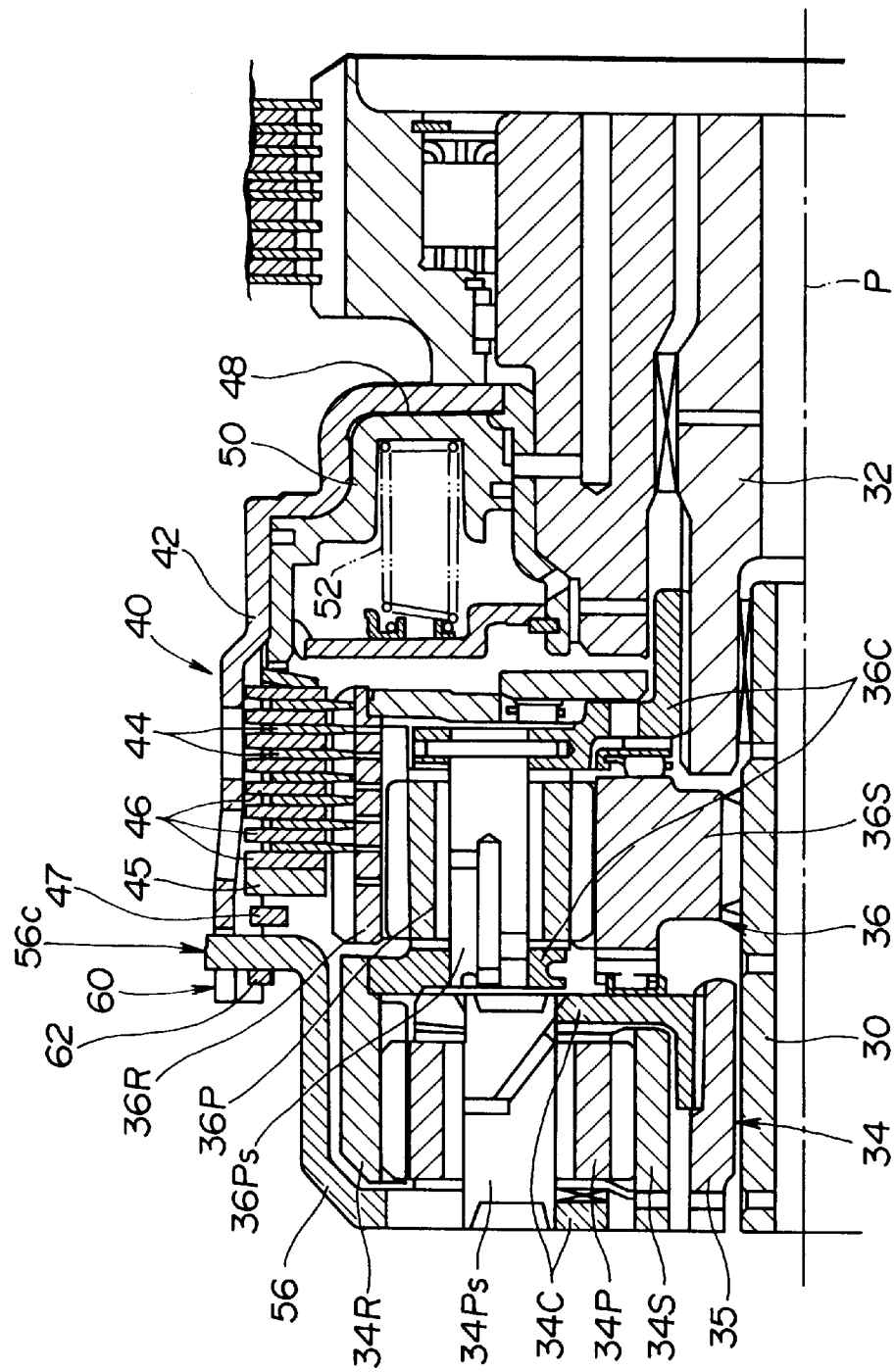
FIG. 1 is a partial longitudinal cross-sectional view illustrating a power-transmission device of an automatic transmission, employing a structure of spline connection made according to the invention.

Referring now to the drawings, particularly to FIG. 1, the structure of spline-connection of the invention is exemplified in case of a power-transmission device for an automobile automatic transmission. A transmission input shaft 30 and a transmission output shaft 32 are arranged concentric to each other with respect to an axis P in a transmission case (not shown), so that the two shafts 30 and 32 are rotatable about the axis P. The output torque (a rotational force) from a turbine shaft (not shown) of a torque converter is transmitted to the input shaft 30. A first planetary gearset 34 and a second planetary gearset 36 are mounted on the input shaft 30 so that the first and second planetary gearsets 34 and 36 are arranged coaxially with respect to the central axis P of the input shaft 30. The first planetary gearset 34 includes a central sun gear 34S, a plurality of planet pinion gears 34P, and a ring gear 34R. Each of the planet pinions 34P is rotatably mounted on the associated pinion shaft 34Ps whose opposite ends are fixedly connected to a planet pinion carrier 34C. The planet pinion carrier 34C is splined to a planet shaft 35 that is exactly coaxially aligned with the input shaft 30 so that the planet shaft 35 is rotatable relative to the input shaft 30. The second planetary gearset 36 includes a central sun gear 36S, a plurality of planet pinion gears 36P and a ring gear 36R. The sun gear 36S is integrally formed on its inner periphery with internal splines through which the sun gear 36S is splined to the input shaft 30. Each of the planet pinions 36P is rotatably mounted on the associated pinion shaft 36Ps whose opposite ends are fixedly connected to a planet pinion carrier 36C. The planet pinion carrier 36C is splined to the output shaft 32. The left-hand side of the planet pinion carrier 36C, facing the first planetary gearset 34, is fixedly connected to the ring gear 34R of the first planetary gearset 34. A so-called forward clutch 40, constructing part of friction elements of the automatic transmission, is installed on the outer periphery of the ring gear 36R of the second planetary gearset 36, so that the forward clutch 40 functions to stop or permit power transmission between the ring gear 36R of the second planetary gearset 36 and the clutch drum 42. As shown in FIG. 1, several longitudinal external splines are formed integral with the ring gear 36R and consist of circumferentially equally-spaced keys cut on the outer periphery of the ring gear 36R. Several longitudinal internal splines are formed integral with the clutch drum 42 and usually consist of circumferentially equi-distant spaced keyways cut on the inner periphery of the drum 42. In the shown embodiment, the forward clutch 40 comprises a typical multiple disc clutch pack, being comprised of an alternating series of clutch plates (driven plates 46) and discs (driving discs 44), and a pressure plate such as a conical spring disc (not numbered). Each of the driven plates 46 is keyed on its outer edge, whereas each of the driving discs 44 is keyed on its inner edge. The internal splines of the plural driving discs 44 mounted on the ring gear 36R are fitted onto the external splines of the ring gear 36R. On the other hand, the external splines of the plural driven plates 46 mounted on the clutch drum 42 are fitted into the internal splines of the clutch drum 42. These spline connections between the clutch driven plates 46 and the clutch drum 42 and between the clutch driving discs 44 and the ring gear 36R, are designed to permit axial sliding movement of each of the clutch driven plates 46 and driving discs 44 in the opposite axial directions of the axis P of the transmission input and output shafts 30 and 32. Reference sign 45 denotes a retaining plate provided adjacent to the leftmost clutch driven plate 46 and having external splines which are fitted into the internal splines of the clutch drum 42. Reference sign 47 denotes a snap ring which is engageable with the retaining plate 45 by way of the axial leftward movement of the retaining plate 45. Generally, there is a specified clearance between the snap ring 47 and the retaining plate 45, for proper engagement and disengagement of the clutch 40.

During ahead driving, when working fluid is fed into a pressure chamber 48 (a cylinder chamber), the piston 50, which is operably disposed in the clutch drum 42, moves axially leftwards (viewing FIG. 1) against the bias of the piston spring 52 with oil pressure applied to the piston 50. The axial leftward movement of the piston 50 causes the driving plates 44 and the driven discs 46 to engage with each other to permit power transmission between the ring gear 36R of the secondary planetary gearset 36 and the clutch drum 42. In any other state of the vehicle, e.g., with the transmission in reverse, other than the ahead driving state, the pressure in the cylinder chamber 48 is reduced below a predetermined pressure level and then the piston 50 shifts to the spring-loaded position (the rightmost position) as shown in FIG. 1 by means of the bias of the piston spring 52. Thus, the forward clutch 50 is held in the disengagement position in which the driving discs 44 rotate freely between the driven plates 46. Under such a released condition of the clutch 50, there is no power transmission between the ring gear 36R and the clutch drum 42.

A substantially cylindrical carrier member 56 constructs a part of the planet pinion carrier 34C. The carrier member 56 is provided in a manner so as to surround the outer periphery of the ring gear 34R of the first planetary gearset 34. The carrier member 56 is integrally formed on its outer periphery with several external splines (56a, 56b, 56c) which will be fully described later. The external splines of the carrier member 56 are spline-connected to the internally splined section of the left end of the clutch drum 42.

Figure 2:
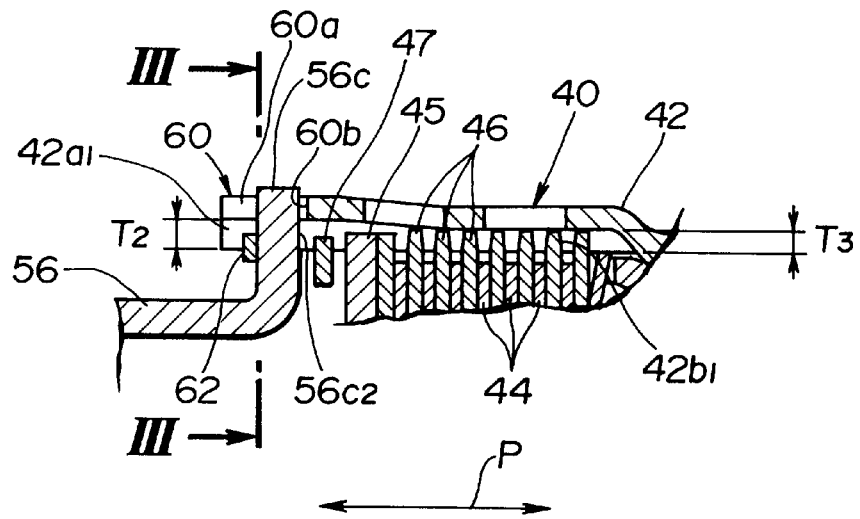
FIG. 2 is an enlarged partial cross-sectional view illustrating details of the structure of spline connection of the power-transmission device shown in FIG. 1.
Figure 3:
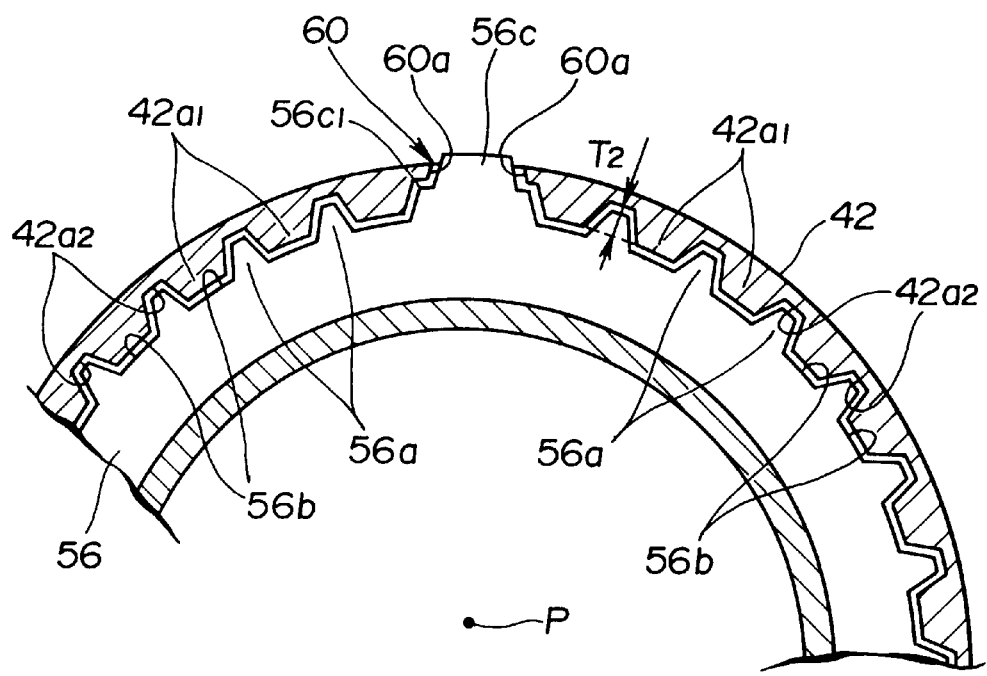
FIG. 3 is a partial cross-section taken along the line III—III of FIG. 2, and illustrating a state of spline-connection between internal splines of the clutch drum and external splines of another power-transmission member (e.g., a planet pinion carrier).

Referring now to FIGS. 2 and 3, respectively showing the enlarged cross-section of the driven plates 46 of the forward clutch 40 and the carrier member 56 both splined to the inner periphery of the clutch drum 42, and showing the cross-section taken along the line III—III of FIG. 2. As seen in FIGS. 2 and 3, several internal splines $42a_1$ of the left end of the clutch drum 42, being spline-connected to the external splines 56a of the carrier member 56, will be hereinafter referred to as "drum-end spline keys". The end spline key $42a_1$ has a radial length $T_2$ (hereafter a spline height). Also, several internal splines $42b1$ of the intermediate section and right end of the drum 42, being spline-connected to the external splines of the driven plates 46 of the forward clutch 40, will be hereinafter referred to as "central spline keys". The central spline key $42b_1$ has a radial length or spline height $T_3$. For the reasons explained below, the spline height $T_2$ of each of the end spline keys $42a_1$ of the clutch drum 42, spline-connected to the carrier member 56, is dimensioned to be slightly greater than the spline height $T_3$ of each of the central spline keys $42b_1$ of the clutch drum 42, spline-connected to the driven plates 46, that is $T_2 > T_3$. In other words, the internal splined portion of the drum 42 comprises a two-stepped splined structure, consisting of the end splined key of the first spline height $T_2$ and the central splined key of the second spline height $T_3$. As seen in FIG. 3, the clutch drum 42 has a drum-end spline keyway or a drum-end spline groove $42a_2$ between the two adjacent end spline keys $42a_1$. Similarly, the drum 42 has a central spline keyway or a central spline groove (not shown) between the two adjacent central spline keys $42b_1$. As may be appreciated, the spline height of the end spline groove $42a_2$ is dimensioned to be greater than that of the central spline groove between the two adjacent central spline keys $42b_1$. On the other hand, as shown in FIG. 3, the carrier member 56 is integrally formed on its outer periphery with a number of equally-spaced gear-like ridges or external teeth or external splines 56a and a number of equally-spaced troughs or grooves 56b, so that the ridges 56a and troughs 56b alternate with each other. The ridges 56a are fitted into the spline grooves $42a_2$, while the troughs 56b are fitted onto the spline keys $42a_1$. The increased spline height $T_2$ (as compared with the usual spline height $T_3$) effectively increases a contact area between the mating pair, that is, between the end spline keys $42a_1$ and the gear-like ridge 56a of the carrier member 56. This contributes to reduction of the pressure between the mating pair during power-transmission operation. As seen in FIGS. 1 through 3, the drum 42 is formed integral with a cut-out portion 60 which is formed on the leftmost end of the drum 42 by axially cutting at least one of the end spline grooves $42a_2$ from the end of the clutch drum 42. On the other hand, the carrier member 56 is formed on the outer periphery with a relatively large-sized external toothed portion 56c, radially outwardly projecting through the cut-out portion 60, so that the external toothed portion 56c fits to or engages with the cut-out portion 60. As clearly seen in FIG. 3, the two opposite circumferentially-facing surfaces $56c_1$ (the two opposite taped or sloped side walls) of the external toothed portion 56c are contoured with respect to the two opposite circumferentially-facing inside surfaces 60a of the cut-out portion 60 and the tapered or sloped surfaces of the end spline keys $42a_1$ being continuous with the inside surfaces 60a, so that the two opposite circumferentially-facing surfaces $56c_1$ of the external toothed portion 56c are brought into surface-contact with the inside surfaces 60a and the tapered surfaces of the end spline keys $42a_1$ during the power-transmission operation. The right-hand radially-extending surface $56c_2$ of the external toothed portion 56c is associated with the radially-extending cut-out surface 60b of the cut-out portion 60, such that the radially-extending surface $56c_2$ is brought into surface-contact with the cut-out surface 60b owing to the axial leftward motion of the drum 42. The clutch drum 42 is further formed in the end spline keys with a circumferentially-extending groove into which a snap ring 62 is fitted. The groove for the snap ring 62 is formed at the left-hand side rather than the outer periphery of the carrier member 56. As described later, the cut-out surface 60b and the snap ring 62 serve as a stopper for restricting the opposite axial movements of the clutch drum 42.

With the previously-noted arrangement, when the clutch drum 42 rotates about the axis P, a rotational force of the drum 42 is transmitted to the carrier member 56 and the to the planet pinion carrier 34C, since the external tooth or the gear-like ridges 56a of the carrier member 56 are spline-connected to the end spline keys $42a_1$ of the drum 42 with the increased contact area. The external splines of the carrier member 56 are fitted to the inner splines of the clutch drum 42 so that the tapered surfaces of the end spline keys $42a_1$ of the clutch drum circumferentially face to the tapered side walls of the external teeth 56a of the carrier member 56. The increased spline height $T_2$ of each of the end spline keys $42a_1$ and the external teeth 56a increases a radial length of torque receiving mating section (that is, an effective torque receiving area), thus lowering the pressure between the mating pair. Additionally, since the relatively large-sized external tooth 56a of the carrier member 56 is also fitted into the cut-out portion 60, the mating pair of the circumferentially-facing stepped surfaces $56c_1$ of the external toothed portion 56c and the circumferentially-facing inside surface 60a of the cut-out portion 60 and the tapered side wall of the end spline key $42a_1$, can be mated with each other with a relatively large contact area. This more effectively reduces the pressure on the contact area. In other words, the previously-discussed increased spline height $T_2$ eliminates the necessity of increase in the thickness (the axial length) of the carrier member 56. Furthermore, the increased spline height ($T_2 > T_3$) contributes to an increase in mechanical strength of the external teeth 56a of the carrier member 56, and whereby the carrier member 56 can be small-sized and lightened. Moreover, after installation of the snap ring 62 on the inner periphery of the clutch drum 42, the radially outwardly projecting external toothed portion 56c of the carrier member 56 is placed within a slight installation clearance defined between the radially-extending inside surface of the snap ring 62 and the radially-extending cut-out surface 60b. That is, the external toothed portion 56c is sandwiched between the snap ring 62 and the cut-out surface 60b. Thus, when the clutch drum 42 moves in one axial direction (e.g., in the axial leftward direction), the maximum leftward movement of the drum 42 is restricted by way of abutment between the cut-out surface 60b and the right-hand radially-extending surface $56c_2$ of the external toothed portion 56c. Conversely, when the drum 42 moves in the other axial direction (e.g., in the axial rightward direction), the maximum rightward movement of the drum 42 is restricted by way of abutment between the inside surface of the snap ring 62 and the left-hand radially-extending surface of the external toothed portion 56c. In this manner, the two opposite axial movements of the drum 42 are effectively restricted by properly setting the installation clearance for the external toothed portion 56c of the carrier member 56 at a minimum value (almost zero clearance). This prevents undesired collision contact between the drum 42 and another power-transmission member (i.e., the carrier member 56 of the planet pinion carrier 34C), thus preventing noises.

Figure 4:
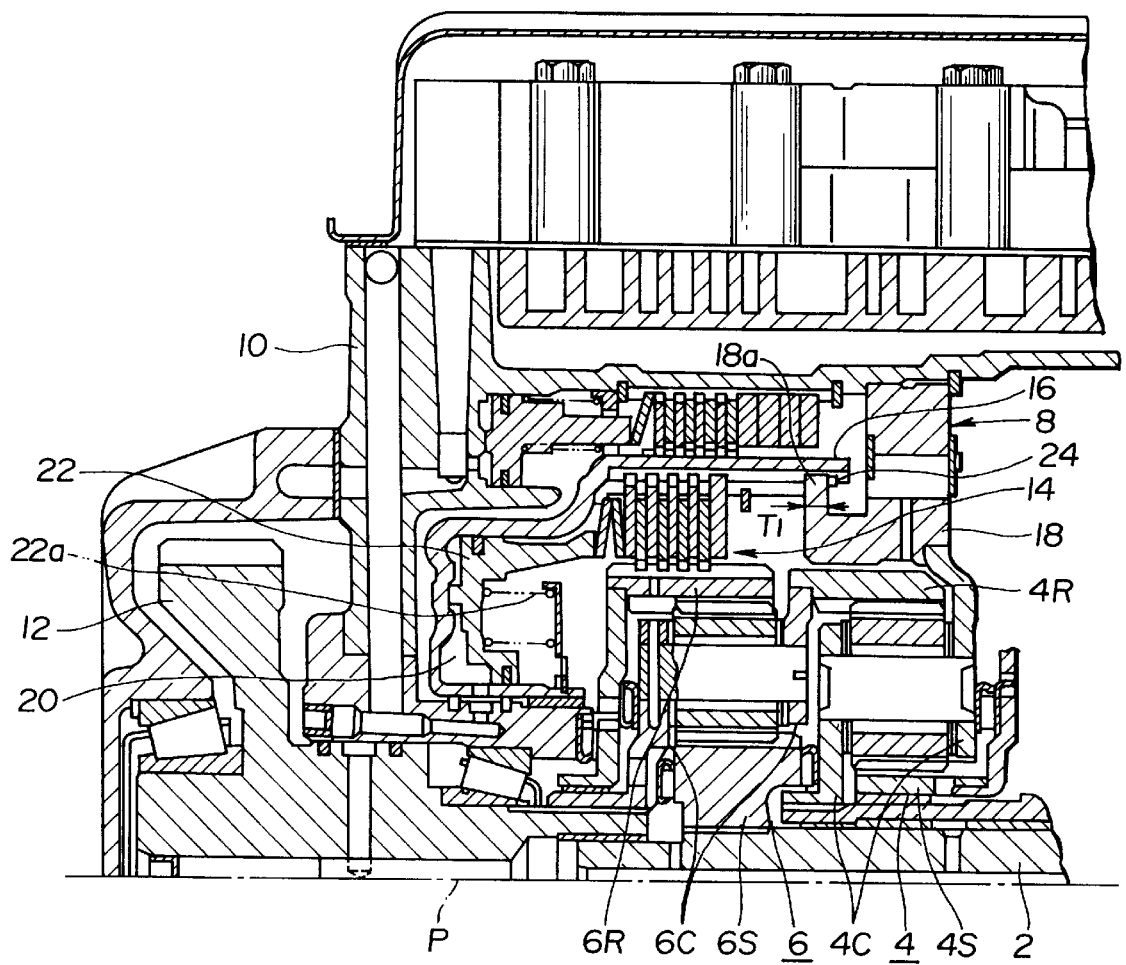
FIG. 4 is a partial longitudinal cross-sectional view illustrating a power-transmission device of an automatic transmission, employing a structure of spline connection of the prior art.

In the shown embodiment, although one cut-out portion 60 is formed at the end (substantially at the leftmost end) of the clutch drum 42 and the carrier member 56 is partially formed with one relatively large-sized, radially outwardly projecting external toothed portion 56c being fitted to the cut-out portion 60, it will be appreciated that a plurality of cut-out portions formed at the end of the drum 42 may be fitted to respective large-sized, radially outwardly extending external toothed portions formed at the carrier member 56 to provide the same effects as the embodiment. Also, in the embodiment, although the spline-connection structure of the invention is exemplified in terms of the forward clutch 40 with the clutch drum 42 associated with the carrier member 56 of the planet pinion carrier 34C, the spline-connection structure of the invention may be applied to the other different friction elements such as multiple-disc type clutches. For example, the concept of the invention can be applied to the friction element (the multiple disc clutch pack 14) of the prior art discussed by reference to FIG. 4, in which an external splined portion of the clutch driven plates of the clutch pack and an external splined portion of the inner race of the one-way clutch are both splined to the inner splined portion of the clutch drum. In the shown embodiment, the two-stepped splined structure of the invention is used for the internal splined section of the clutch drum, it will be understood that such a two-stepped splined structure may be applied to an external splined section of a friction element without departing from the present invention.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A spline-connection structure for a power-transmission device, comprising:

a clutch drum having a longitudinal internal splined portion formed on and extending axially along an inner peripheral surface of said clutch drum, said longitudinal internal splined portion including (i) a first splined portion formed at a diametrically-enlarged drum end of said clutch drum and (ii) a second splined portion formed at a substantially central section of said clutch drum, said first splined portion having internal spline elements separated by internal spline grooves and having a cut-out portion cut through at least one of said internal spline grooves;

another power-transmission member including (i) an external splined portion having external spline elements for splined engagement with said internal spline grooves of said first splined portion and (ii) an external toothed portion dimensioned to project radially outwardly through said cut-out portion of said first splined portion, said external toothed portion being circumferentially spaced from said external spline elements of said external splined portion; and clutch plates for splined engagement with said second splined portion of said clutch drum, wherein a spline height ($T_2$) of said internal spline elements of said first splined portion is greater than a spline height ($T_3$) of internal spline elements of said second splined portion, and wherein a spline height of said external spline elements of said external splined portion of said another power-transmission member is substantially equal to the spline height ($T_2$) of said internal spline elements of said first splined portion.

2. A spline-connection structure for a power-transmission device, as set forth in claim 1, wherein side walls of said internal spline elements of said first splined portion and side walls of said external spline elements of said external splined portion mesh along substantially an entire dimension of the spline height of said external spline elements.

3. A spline-connection structure for a power-transmission device, as set forth in claim 1, which further comprises a snap ring being fitted onto said inner peripheral surface of said clutch drum essentially at an outermost end of said first splined portion, and wherein said external toothed portion of said another power-transmission member is sandwiched between said snap ring and a radially-extending cut-out surface of said cut-out portion.

4. A spline-connection structure for a power-transmission device, comprising:

a two-stepped longitudinal splined portion including (i) an end splined portion formed at a diametrically-enlarged end of said two-stepped longitudinal splined portion and (ii) a central splined portion formed at a central section of said two-stepped longitudinal splined portion, said end splined portion having internal spline elements separated by internal spline grooves and having a cut-out portion cut through at least one of said internal spline grooves;

a first power-transmission member including (i) an external splined portion having external spline elements for splined engagement with said internal spline grooves of said end splined portion and (ii) an external toothed portion dimensioned to project radially outwardly through said cut-out portion of said end splined portion, said external toothed portion being circumferentially spaced from said external spline elements of said external splined portion; and a second power-transmission member for splined engagement with said central splined portion;

wherein a spline height ($T_2$) of said internal spline elements of said end splined portion is greater than a spline height ($T_3$) of internal spline elements of said central splined portion, and wherein a spline height of said external spline elements of said external splined portion of said first power-transmission member is substantially equal to the spline height ($T_2$) of said internal spline elements of said end splined portion.

* * * * *